US011493321B2

(12) United States Patent
Kosel et al.

(10) Patent No.: US 11,493,321 B2
(45) Date of Patent: Nov. 8, 2022

(54) LASER-INDUCED GRAPHENE-BASED BENDING SENSOR AND METHOD

(71) Applicant: KING ABDULLAH UNIVERSITY OF SCIENCE AND TECHNOLOGY, Thuwal (SA)

(72) Inventors: Jürgen Kosel, Thuwal (SA); Marco Marengo, Turin (IT); Giovanni Marinaro, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 272 days.

(21) Appl. No.: 16/757,520

(22) PCT Filed: Oct. 16, 2018

(86) PCT No.: PCT/IB2018/058019
§ 371 (c)(1),
(2) Date: Apr. 20, 2020

(87) PCT Pub. No.: WO2019/082022
PCT Pub. Date: May 2, 2019

(65) Prior Publication Data
US 2020/0348121 A1 Nov. 5, 2020

Related U.S. Application Data

(60) Provisional application No. 62/575,627, filed on Oct. 23, 2017.

(51) Int. Cl.
*G01L 1/00* (2006.01)
*G01B 7/16* (2006.01)
(Continued)

(52) U.S. Cl.
CPC .............. *G01B 7/18* (2013.01); *C01B 32/184* (2017.08); *C01B 32/194* (2017.08); *G01L 1/18* (2013.01);
(Continued)

(58) Field of Classification Search
CPC ....... G01B 7/18; C01B 32/184; C01B 32/194; C01B 2204/32; G01L 1/18; H01C 10/10
See application file for complete search history.

(56) References Cited

U.S. PATENT DOCUMENTS 10,282,011 B2 * 5/2019 McMillen ............... G01L 1/146
2016/0153762 A1 * 6/2016 Li ............................ G01L 1/00
73/774

(Continued)

FOREIGN PATENT DOCUMENTS

WO 2016133571 A2 8/2016

OTHER PUBLICATIONS

Alfadhel, A., et al., "Magnetic Nanocomposite Cilia Tactile Sensor," Advanced Materials, Oct. 21, 2015, vol. 27, pp. 7888-7892.
(Continued)

*Primary Examiner* — Max H Noori
(74) *Attorney, Agent, or Firm* — Patent Portfolio Builders PLLC (57) ABSTRACT

A bending sensor includes a flexible substrate made of polyimide; a laser-induced graphene electrode formed into a top surface of the flexible substrate; and first and second pads formed as a laser-induced graphene into the top surface of the flexible substrate, wherein the first and second pads are in electrical contact with the laser-induced graphene electrode. A bending of the flexible substrate and the laser-induced graphene electrode changes a resistivity of the laser-induced graphene electrode, which is indicative of an amount of bending.

19 Claims, 12 Drawing Sheets

(51) Int. Cl.
  *C01B 32/184* (2017.01)
  *C01B 32/194* (2017.01)
  *G01L 1/18* (2006.01)
  *H01C 10/10* (2006.01)

(52) U.S. Cl.
  CPC .......... *H01C 10/10* (2013.01); *C01B 2204/32* (2013.01)

(56) References Cited

U.S. PATENT DOCUMENTS

| | | | |
|---|---|---|---|
| 2017/0062821 A1* | 3/2017 | Tour | H01M 10/054 |
| 2019/0088420 A1* | 3/2019 | Tour | H01G 11/36 |
| 2019/0143275 A1* | 5/2019 | Arnusch | C08G 73/10 |
| | | | 210/636 |
| 2019/0308880 A1* | 10/2019 | Tour | B33Y 10/00 |
| 2019/0330064 A1* | 10/2019 | Tour | B01D 67/006 |

OTHER PUBLICATIONS

Novoselov, K.S., et al., "A Roadmap for Graphene," Nature, Oct. 11, 2012, vol. 490, pp. 192-200.

Communication pursuant to Article 94(3) EPC in corresponding/related European Application No. 18797143.7, dated Mar. 10, 2021.
International Search Report in corresponding/related International Application No. PCT/IB2018/058019, dated Jan. 22, 2019.
Luo, S., et al., "Direct Laser Writing for Creating Porous Graphic Structures and their use for Flexible and Highly Sensitive Sensor and Sensor Arrays," Carbon, Sep. 28, 2015, vol. 96, pp. 522-531, Elsevier, Oxford, GB.
Marengo, M., et al., "Flexible Temperature and Flow Sensor from Lazer-Induced Graphene," 2017 IEEE Sensors, Oct. 29, 2017, pp. 1-3.
Novoselov, K.S., et al., "Electric Field Effect in Atomically Thin Carbon Films," Science, Oct. 22, 2014, vol. 306.
Pang, C., et al., "Recent Advances in Flexible Sensors for Wearable and Implantable Devices," Journal of Applied Polymer Science, Jun. 26, 2013, vol. 3, pp. 1429-1441.
Written Opinion of the International Searching Authority in corresponding/related International Application No. PCT/IB2018/058019, dated Jan. 22, 2019.
Communication pursuant to Article 94(3) EPC in corresponding/related EP Application No. 18797143.7, dated Mar. 1, 2022.
First Examination Report in corresponding/related Saudi Application No. 520411815, dated Jun. 29, 2022.

* cited by examiner

LASER-INDUCED GRAPHENE-BASED BENDING SENSOR AND METHOD

CROSS-REFERENCE TO RELATED APPLICATIONS

This application is a U.S. National Stage Application of International Application No. PCT/IB2018/058019, filed on Oct. 16, 2018, which claims priority to U.S. Provisional Patent Application No. 62/575,627, filed on Oct. 23, 2017, entitled "A LASER INDUCED GRAPHENE FLOW SENSOR," the disclosures of which are incorporated herein by reference in their entirety.

TECHNICAL FIELD

Embodiments of the subject matter disclosed herein generally relate to methods and systems for measuring a characteristic of the ambient, and more particularly, to mechanisms and techniques for more accurately and efficiently measuring a bending of a laser-induced graphene electrode.

BACKGROUND

Commercially available flow sensors use different working principles such as mechanical movement of a piston, differential pressure (Venturi meter), and thermal gradient. Piezoresistivity, the property of some materials to change their resistance when mechanically deformed, is not commonly used in macroscale flow meters, but it is widely applied in Micro Electro-Mechanical Systems (MEMS). Usually, in a microscale device, the flow is measured through a piezoresistive material deposited on top of a cantilever which bends under the fluid pressure.

However, the existing sensors require an elaborate manufacturing process and are expensive. Further, most of the existing flow sensors are rigid, which prevents them to being used in many applications that require a flexible sensor. Thus, there is a need to provide a new sensor that is flexible, accurate, cheap and easy to be manufactured.

SUMMARY

According to an embodiment, there is a bending sensor that includes a flexible substrate made of polyimide, a laser-induced graphene electrode formed into a top surface of the flexible substrate, and first and second pads formed as a laser-induced graphene into the top surface of the flexible substrate, wherein the first and second pads are in electrical contact with the laser-induced graphene electrode. A bending of the flexible substrate and the laser-induced graphene electrode changes a resistivity of the laser-induced graphene electrode, which is indicative of an amount of bending.

According to another embodiment, there is a hand-held bending measuring instrument that includes a body, a bending sensor attached to the body, and a measuring device that translates measurements of the bending sensor into a given parameter. The bending sensor includes a flexible substrate made of polyimide; and a laser-induced graphene electrode formed into a top surface of the flexible substrate. A bending of the flexible substrate and the laser-induced graphene electrode changes a resistivity of the laser-induced graphene electrode, which is indicative of an amount of bending.

According to still another embodiment, there is a method for forming a bending sensor. The method includes a step of providing a flexible substrate made of polyimide, a step of providing a laser device at a given distance from the flexible substrate, and a step of carbonizing with the laser a portion of the flexible substrate to form a laser-induced graphene electrode on a top surface of the flexible substrate.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a flow sensor. However, the current inventive concepts may be used for other type of sensors, for example, motion sensors, force sensors, acceleration sensors, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Graphene has been firstly fabricated by Novoselov et al. in 2004 [1]. This relatively new material is a semi-metal with small overlap between the valence and the conduction bands (zero bandgap material). It is an allotrope (form) of carbon consisting of a single layer of carbon atoms arranged in a hexagonal lattice. Graphen is the basic structural element of many other allotropes of carbon, such as graphite, diamond, charcoal, carbon nanotubes and fullerenes. Great effort has been put into finding possible ways to produce graphene and exploit its outstanding electrical, mechanical and chemical properties.

At the same time, flexible sensors have seen an increase in interest for applications in wearable devices. These two lines of research intersect in the fabrication of porous graphene on polyimide (PI) films through laser irradiation. The material thus obtained, defined as laser-induced graphene (LIG), is constituted by conductive patterns formed directly on insulating and flexible substrates. These patterns can be used in different applications in the micro- and macro-scale.

Concerning a flow sensor, its working principle is based on the deflection of a paddle made of PI, which is detected through a LIG conductive pattern formed on its top surface. Different flow rates induce different deformations of the paddle that allow to measure the speed of the flow. This paddle concept with bending induced strain has previously been exploited using magnetic materials and showed promising results [2][3].

In one embodiment, the flow sensor has the LIG material acting as the piezoresistive electrode whereas the PI flexible substrate plays the role of the cantilever. The versatility of this design, in combination with the cost-effective fabrication process, allows to obtain bending sensors that can be used both in micro and macro scale measurements in a wide range of flow speeds. Although many commercially available flow sensors possess excellent durability and high sensitivity, they are not biocompatible and only a few flexible sensors are currently available on the market.

Potential benefits of a LIG-based sensor arise from the peculiar electrical, thermal and mechanical performances of the LIG material, along with a cheap and simple fabrication process. The LIG-based sensor may act as a temperature sensor, as the LIG material acts as a negative temperature coefficient thermistor with a non-linear response typical of semi-metals. In this regard, the thermistors are divided into two main categories: NTC (Negative Temperature Coefficient) and PTC (Positive Temperature Coefficient). NTC thermistors are made of semiconducting materials (metal oxides) and are characterized by a decrease of the resistance, when the temperature increases, since more electrons are available in the conduction band. PTC thermistors are made of ceramic or plastic materials and exhibit an increase of resistance when the temperature increases. If the LIG-based sensor is used as a thermistor, it shows a 4% decrease of the resistance in a temperature range of 20-60° C.

The LIG-based flow sensor exploits the piezoresistive properties of the laser-induced graphene and can be used both in gaseous and liquid media thanks to a protective polydimethylsiloxane coating. Some of the characteristics of the LIG-based flow sensor are the ultra-fast response and the versatility in design offered by the laser technology.

Figure 1A:
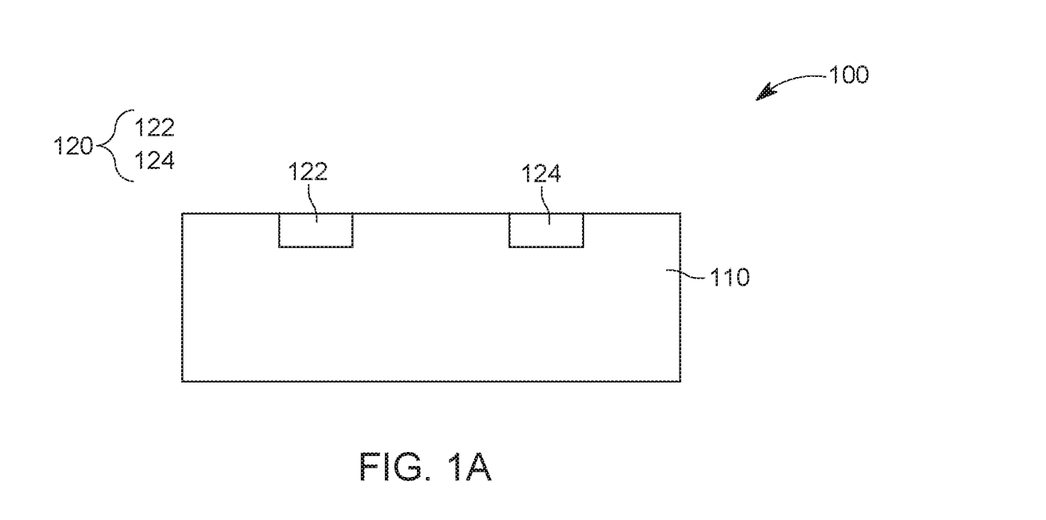
FIGS. 1A and 1B illustrate a bending sensor formed on a flexible substrate.
Figure 1B:
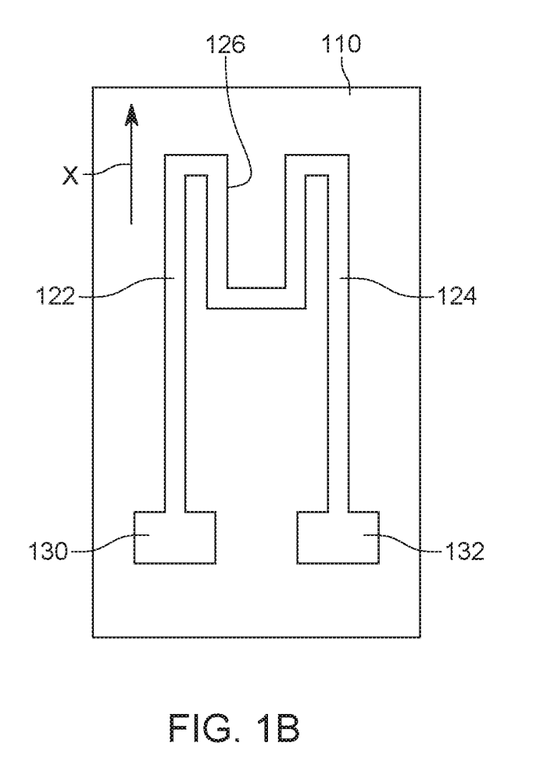
Figure 2:
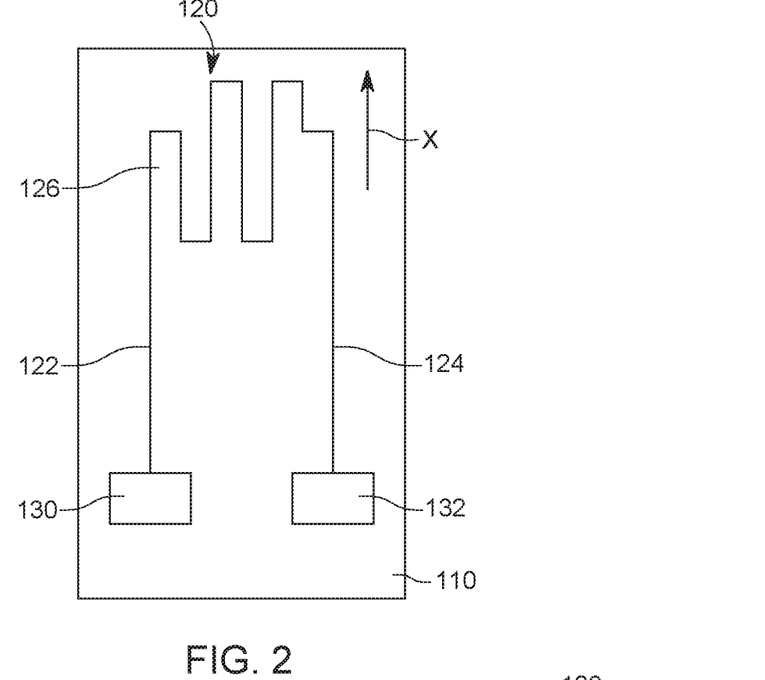
FIGS. 2 and 3 illustrate various shapes of an electrode of the bending sensor.
Figure 3:
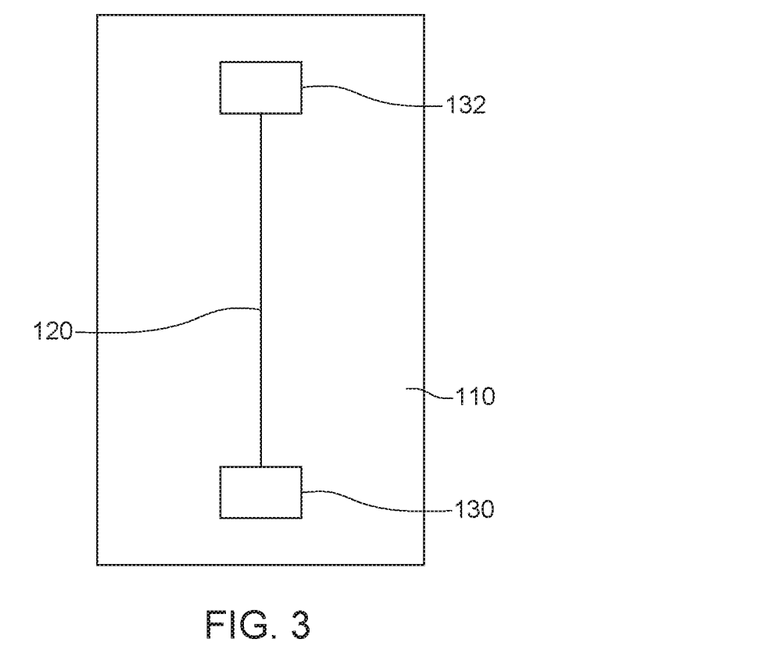

According to an embodiment illustrated in FIGS. 1A and 1B, a bending sensor 100 includes a flexible substrate 110 and a LIG electrode 120. The LIG electrode 120 is formed into the substrate 110, as discussed later. FIG. 1A shows the first and second portions 122 and 124 of the LIG electrode 120. While FIG. 1A is a vertical cross-section of the sensor 100, FIG. 1B is a top-view of the same sensor and it shows a specific shape of the LIG electrode 120, which includes plural sections 126 oriented at different angles relative to a longitudinal axis X. The ends of the LIG electrode may be terminated in pads 130 and 132. However, the LIG electrode 120 may be shaped in different arrangements. For example, as illustrated in FIG. 2, the LIG electrode 120 has plural sections 126 placed at various positions along the axis X. FIG. 3 shows another possible configuration of the LIG electrode 120, where the LIG electrode 120 is a straight line and the two pads 130 and 132 are placed at opposite ends of the substrate 110. Note that the configurations shown in FIGS. 1A to 2 have the pads located at the same side of the substrate 110.

Figure 4:
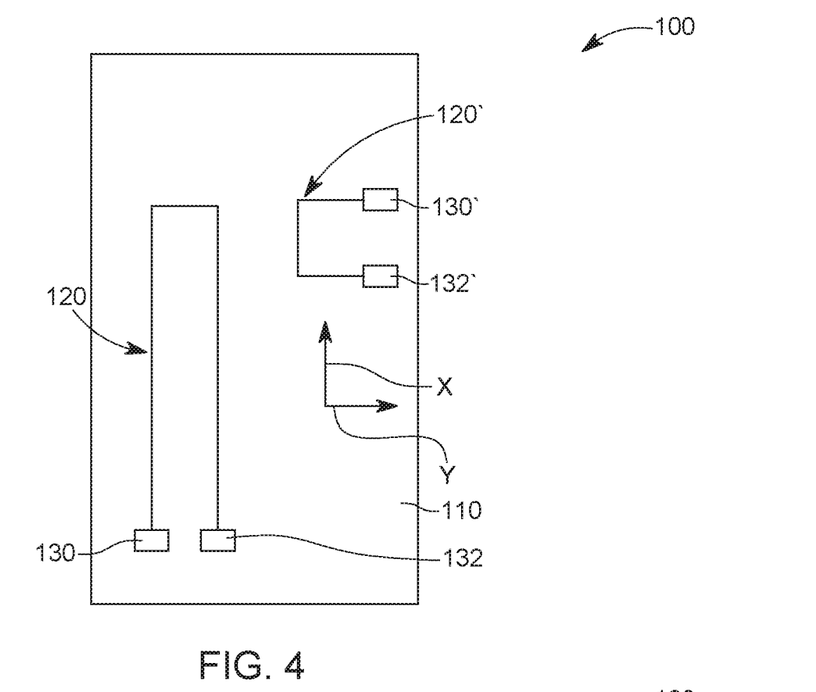
FIG. 4 illustrates a bending sensor having two electrodes formed on a same face and configured to measure a bending about different axes.

FIG. 4 shows another possible configuration of the bending sensor 100. In this configuration, there are two distinct LIG electrodes 120 and 120' formed on the same face of the substrate 110. The first electrode 120 is oriented along the longitudinal axis X while the second electrode 120' is oriented along an axis Y perpendicular to the axis X. The two LIG electrodes may be separately connected to a measuring device (to be discussed later) so that one LIG electrode 120' determines a bending of the sensor about/around the X axis and the other LIG electrode 120 determines a bending of the sensor about/around the Y axis.

Figure 5:
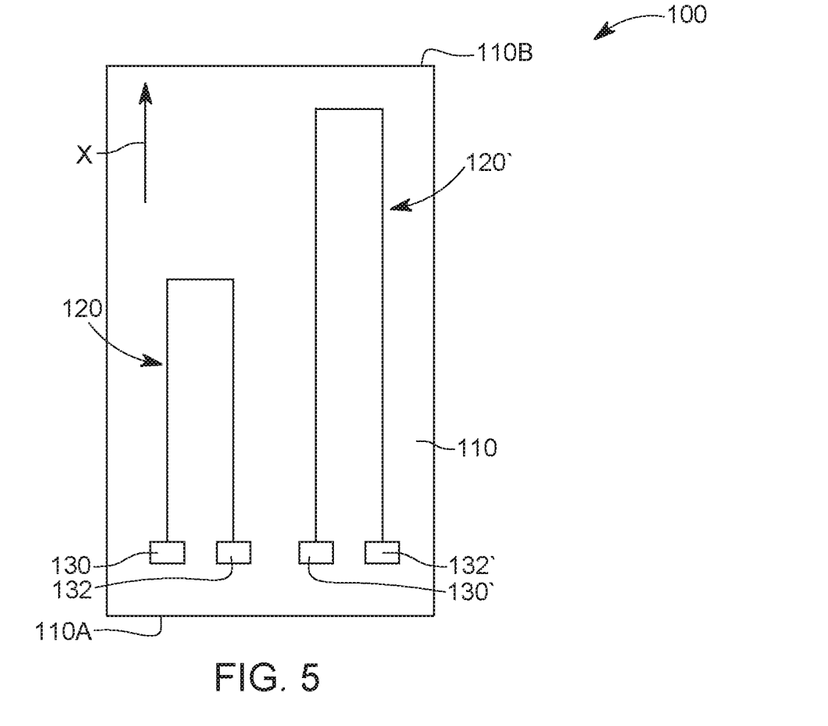
FIG. 5 illustrates a bending sensor having two electrodes formed on a same face and configured to measure different degrees of bending.

FIG. 5 shows still another possible configuration of the bending sensor 100, in which the first LIG electrode 120 extends along the longitudinal axis X and is placed at a first position along the axis X, and the second LIG electrode 120' also extends along the longitudinal axis X and is placed at a second position along the axis X, for example, closer to a distal end 110B of the substrate 110. Note that when in use, the proximal end 110A of the substrate is fixedly attached to a support (not shown) while the distal end 110B is free to move with a flow that is being measured. For this configuration, the LIG electrode 120 can determine a first bending range and the another LIG electrode 120' can determine a second bending range, that is partially or totally different from the first bending range.

Figure 6:
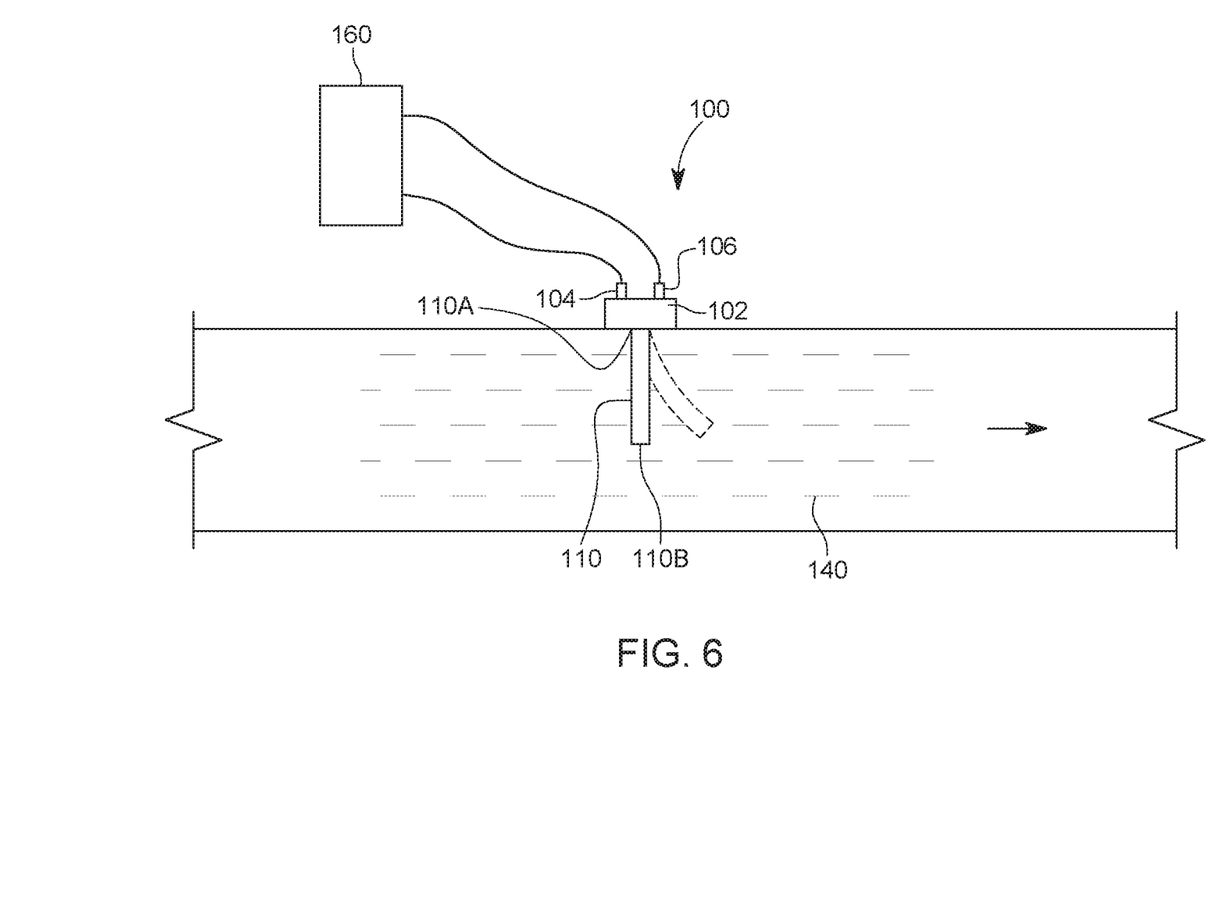
FIG. 6 illustrates a setup for testing a bending sensor.
Figure 7:
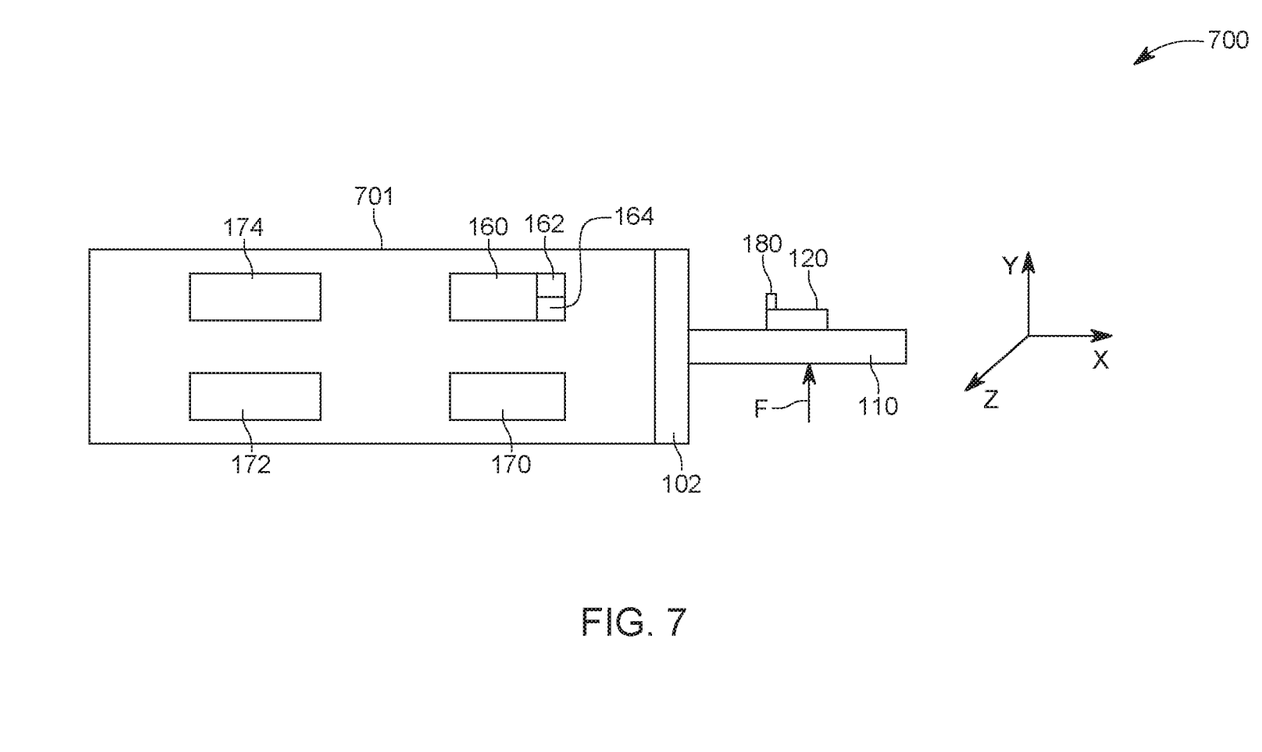
FIG. 7 illustrates an instrument for measuring a bending and displaying a parameter associated with the measured bending.

FIG. 6 illustrates the bending sensor 100 being placed with its substrate inside a flow 140 of a certain fluid. The substrate 110 is shown initially being straight, when there is no flow. As soon as the flow is initiated, the substrate 110 bends (dash line in the figure) with the flow. FIG. 6 also shows the substrate 110 being attached to a base 102 and two electrodes 104 and 106 being located on the base and in electrical contact with the pads 130 and 132 of the LIG electrode 120 (shown in FIG. 1B). These electrodes may be connected to a measuring device 160, for measuring a resistance of the LIG electrode 120 (not shown in this figure). While FIG. 6 shows the measuring device 160 being connected with wires to the bending sensor 100 and also being external to the bending sensor, it is also envisioned, as illustrated in FIG. 7, that the measuring device 160 is part of the bending sensor 100. In this way, the bending sensor 100 could be part of a hand-held device or instrument 700 that has a body 701 which accommodates the measuring device 160 (for example, a processor and a memory), a power source 170, a display 172 that indicates the value measured by the sensor and an input/output interface 174 that allows (wired or wireless) communication between the hand-held device and an external device (not shown).

Still with regard to FIG. 7, note that the substrate 110 may bend in the YX plane to determine the flow, but also in the ZX plane to determine another flow. Because of this ability of the sensor, it is possible to use this sensor to measure other quantities than a fluid flow. For example, it is possible to use this sensor to measure a force applied to the substrate 110, an acceleration, or a change in position. FIG. 7 illustrates this capability of the bending sensor 100 by showing an arrow F that represents a force acting on the sensor. The force F will bend the substrate 110 and the LIG sensor 120, which will affect is resistivity. The change in resistivity can be detected by the measuring device 160 and transformed, for example, based on stored tables in a memory, into a corresponding force. Similarly, as the force is proportional with the mass, the bending sensor 100 can be used to measure an acceleration. The resultant force or acceleration may be then displayed on the display 170.

Alternatively, a change in a position of a given point 180 on the substrate 110 or electrode 120 may be measured with this hand-held device. A difference between an original position $x_0$, $y_0$, $z_0$ of the point 180 and its final position $x_f$, $y_f$, $z_f$ (i.e., change in position), after the substrate has been bent, may be estimated based on the force F applied to the sensor. For this type of calculations, the measuring device 160 may include, in addition to a processor 162 and a memory 164, other necessary electronics, for example, a timer.

Figure 8:
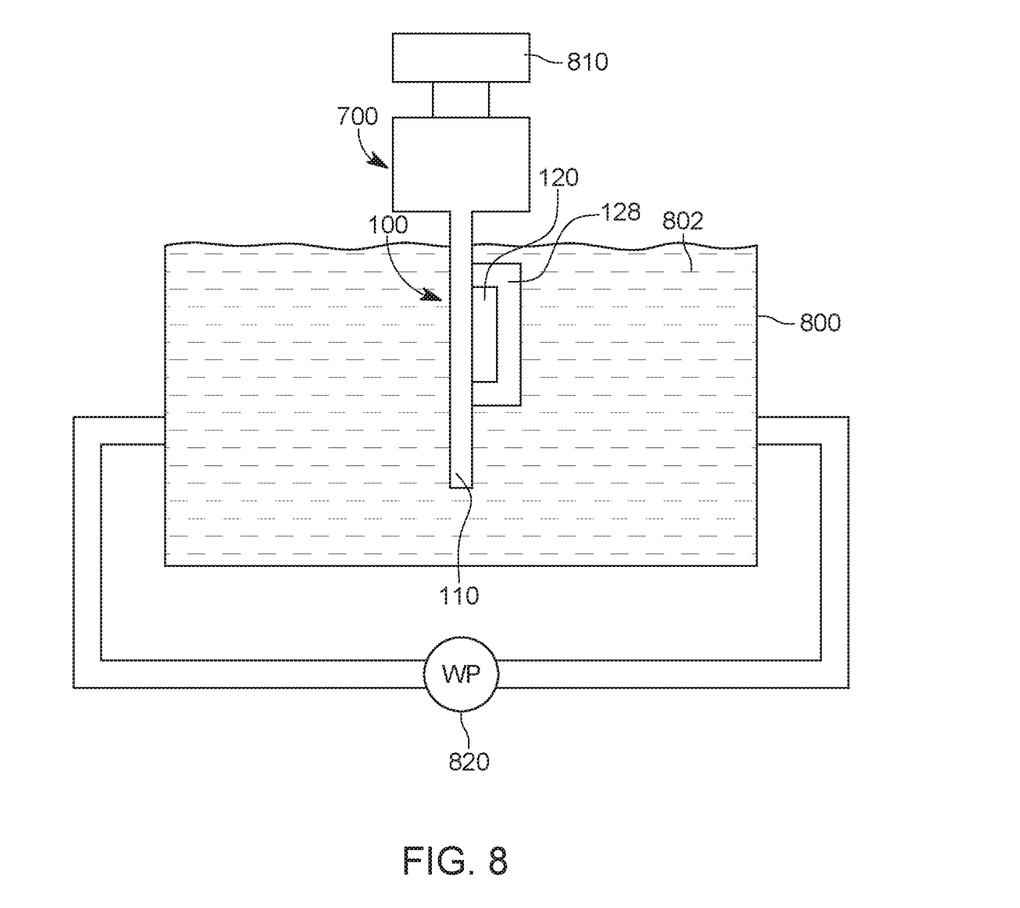
FIG. 8 illustrates a setup for performing flow measurements with the bending sensor.
Figure 9:
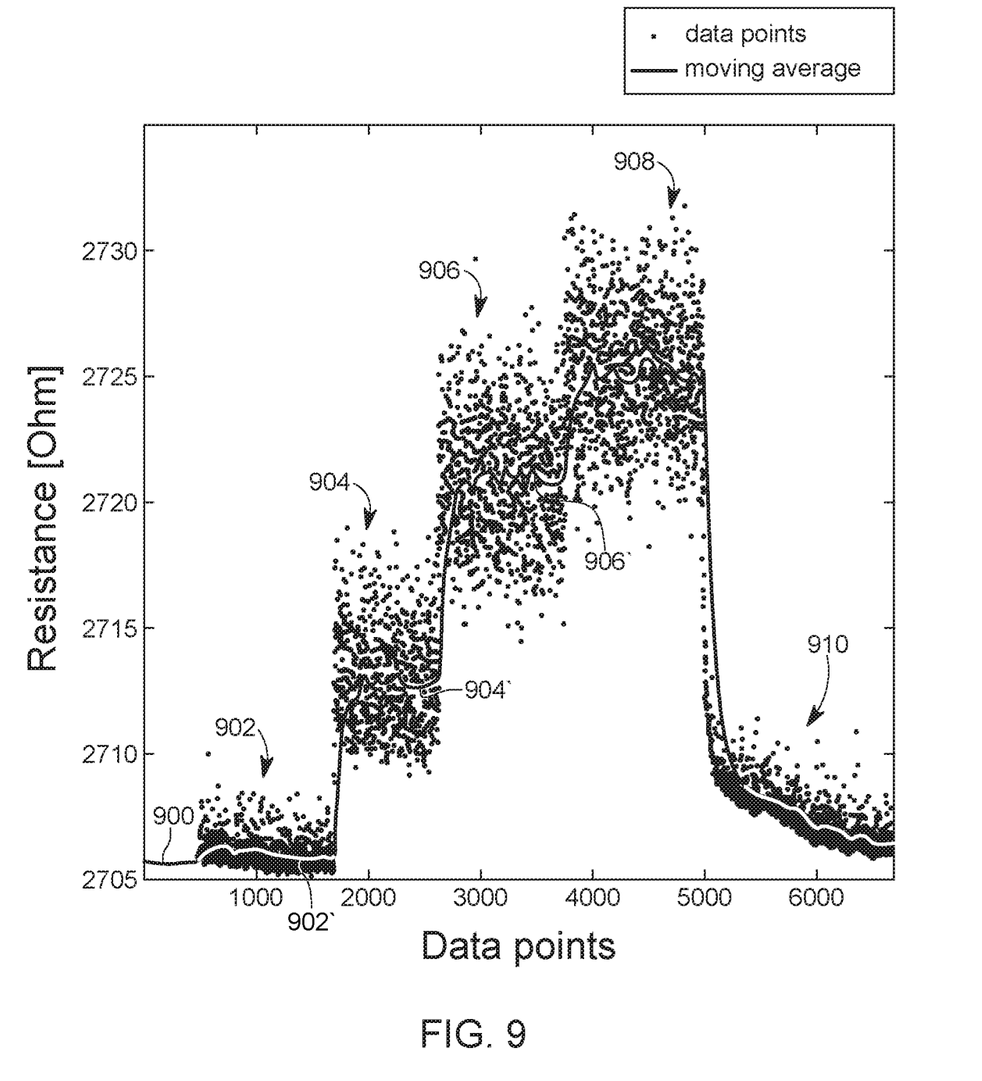
FIG. 9 illustrates the measurements obtained with the bending sensor with the setup of FIG. 8.

The bending sensor 100 discussed above has been tested as follows. First, during the fabrication process of the sensor (which is discussed later in more detail), a polydimethylsiloxane PDMS passivation layer 128, as illustrated in FIG. 8, has been formed over the LIG electrode 120. This layer ensures that water or other fluids that are being measured do not interact with the LIG electrode 120. Then, the entire bending sensor 100 has been placed in a fluid 802 in a chamber 800 to test the flow sensor. The fluid 802 in this experiment was tap water. The insulation of the PDMS passivation layer 128 is initially tested by measuring the resistance of the sensor over a day. No variations have been registered, which indicate that no water has reached the LIG electrode 120. Next, the response of the sensor to different water flow rates is investigated. A two-wire measurement is carried out through a source meter 810, with a test current of 1 mA. The fluid 802 in the tank 800 can be circulated through a pump 820 to generate a flow. For a zero speed of the flow, i.e., the pump 820 is at rest, a value 900 is measured as illustrated in FIG. 9. Then the pump 820 is turned on, and has a first speed. For this first speed, the sensor 100 changes its resistance, as illustrated by the points 902 that correspond to the first speed. Based on a prior calibration, the measuring device 160 is capable of transforming the measured resistance 902 into a value of the first speed. If the measured points 902 are spread as shown in FIG. 9, it is possible to implement in software, in the measuring device 160, calculating an average of the plural points, so that a single value 902' is determined for the flow with the first speed. The same may be accomplished for a second speed (measured points 904), a third speed (measured points 906), a third speed (measured points 908) and so on. For each plurality of these points, the software can average them to generate a single speed 904' or 906'. The spread of the measured points 902 to 908 is due to the turbulence of the water flow as the sensor vibrates around a mean value. This phenomenon explain the noise visible in FIG. 9.

Once the maximum speed is reached, the sensor is exposed again to the first flow speed. The signal 910 returns to the value 902 assumed before, indicating that there is no hysteresis in the sensor's response. This test successfully proved the stability of the piezoresistor 120 in fluid media, which is protected by the PDMS coating. The data points 902 to 910 may be fit with a moving average fit, allowing to clearly see the step-like response. The flow velocity in this experiment is in the range of 1 m/s. However, the sensor provides many degrees of freedom as the design accommodates a large dynamic range or sensitivity, since the sensor can be fabricated in different shapes, due to the small laser spot of approximately 100 μm.

Figure 10:
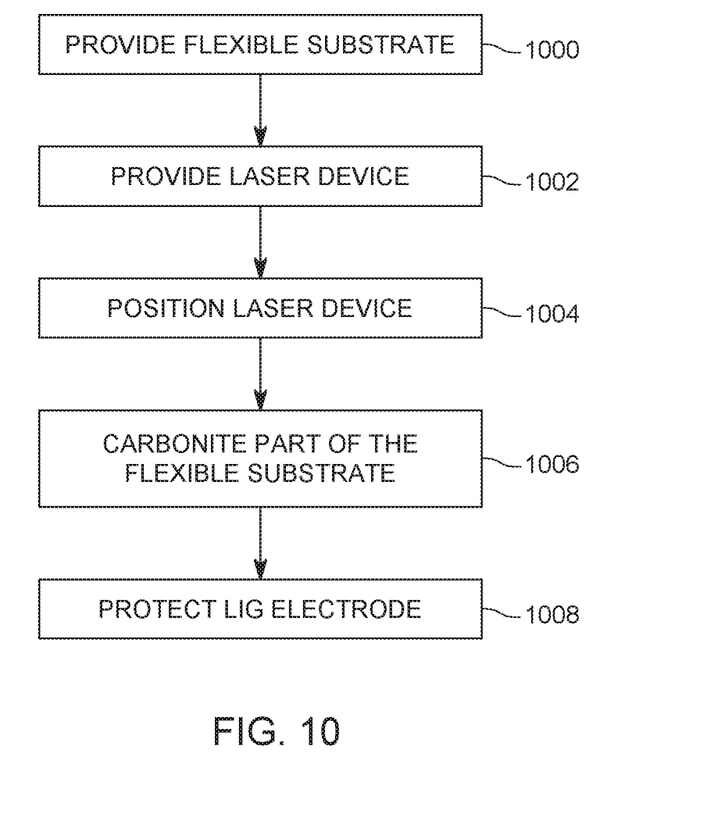
FIG. 10 is a flowchart of a method for manufacturing a bending sensor.
Figure 11A:
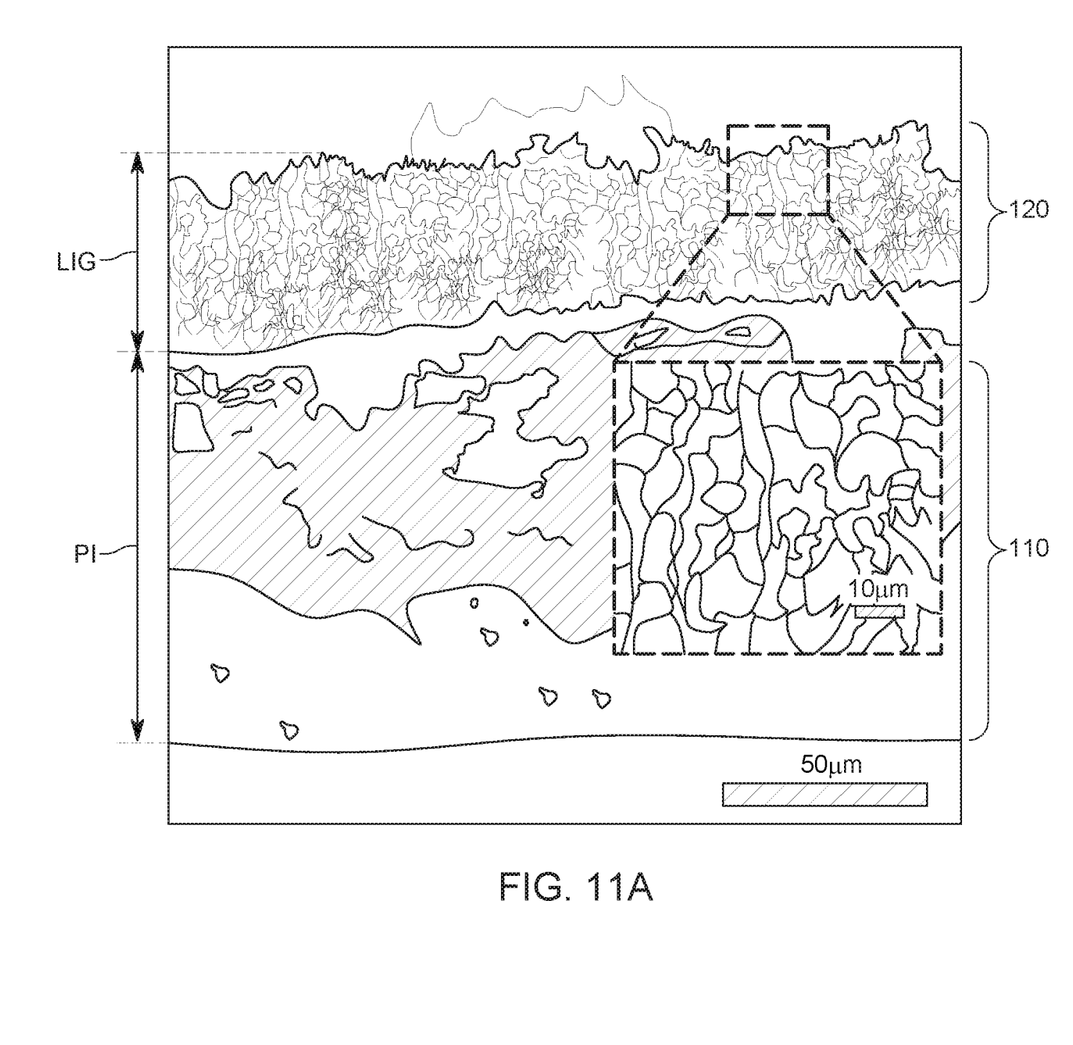
FIG. 11A is a microscopy image of a laser-induced graphene sensor formed in a polyimide substrate.
Figure 11B:
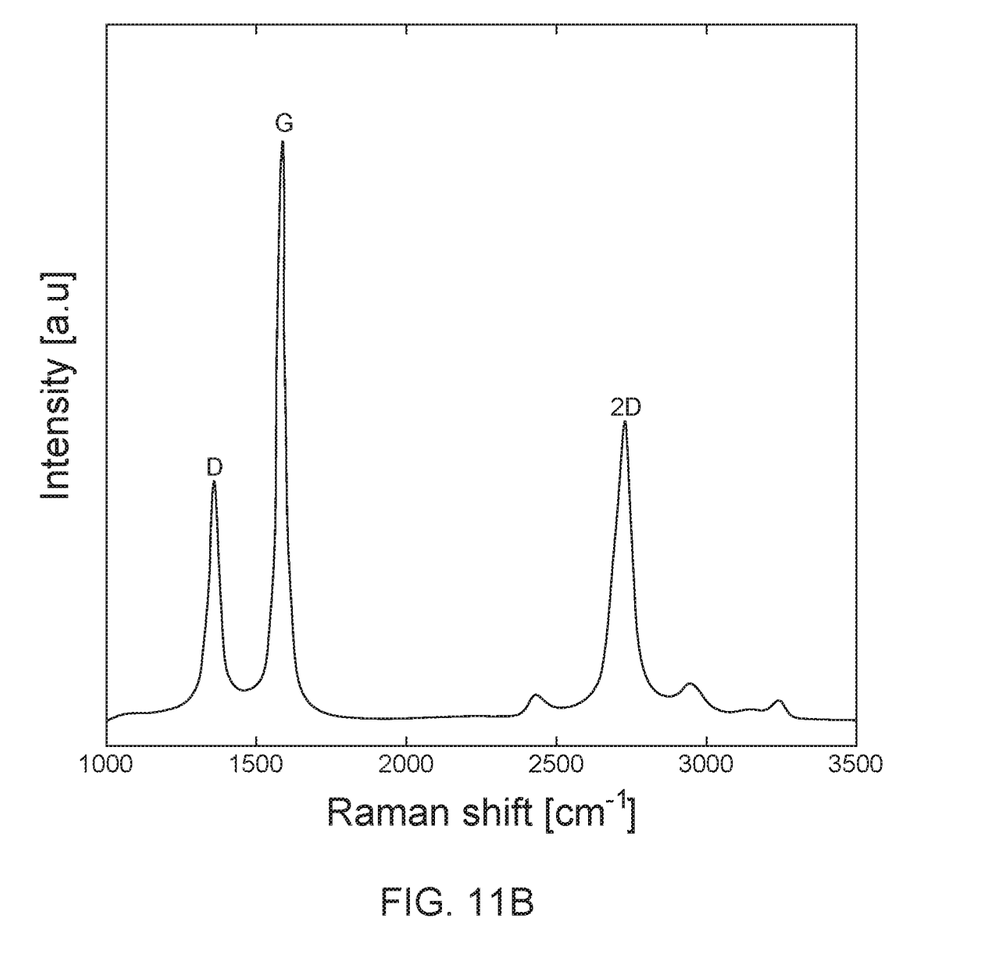
FIG. 11B illustrates the Raman shift of the sensor shown in FIG. 11A.

In one embodiment, a single-step fabrication process is employed for manufacturing the bending sensor 100. When this process is applied, the conductive LIG electrode 120 used as piezoresistor is produced on the flexible substrate 110. The method starts in step 1000, as illustrated in FIG. 10, in which a PI film (for example, 125 μm thick) is provided. This PI film is used as the substrate material. In step 1002, a laser device is provided for carbonizing the substrate. In one application, the laser device is a $CO_2$ laser that has a beam with a wavelength 10.6 μm, power 2 W, speed 16 mm/s, working distance 3 mm, and generates 1000 pulses per inch. As previously discussed, the laser spot when generating the LIG electrode may be around 100 μm. In step 1004, the laser device is positioned relative to the PI substrate and in step 1006 the PI substrate is carbonized through direct laser writing. This thermal process has been thoroughly characterized by Lin et al. [4] and the result of this process is the generation of the LIG electrode 120. FIG. 11A shows the structure of the LIG electrode 120 and substrate 110 when imagined with Raman spectroscopy. In this figure, a thickness of the LIG electrode 120 is about 30 μm and a thickness of the PI substrate is about 125 μm. The inset shows a zoom-in of the porous structure of the LIG electrode. FIG. 11B shows the Raman spectrum of the LIG electrode 120 (manufactured with a laser wavelength of 473 nm) with a prominent G peak related to the vibration of sp2 carbon atoms. The D peak is activated by defects and the 2D peak is the main one in the monolayer graphene.

Returning to FIG. 10, the method optionally may include a step of depositing a protective layer over the LIG electrode, for example, a PDMS layer. The protective layer is necessary as the sensor is immersed into a fluid, when measuring the flow of the fluid, and this layer protects the LIG electrode from the interaction with ions in the fluid. The ions in the fluid might interfere with the measurement due to shunt currents (this step can be avoided if the sensor is used in nonconductive media like air). For this step, a few droplets of PDMS with a ratio of 10(base):1(curing agent) are poured on the center of the device and the sample is placed under vacuum for 20 min to remove air bubbles. Then the PDMS is spread on the surface through spin coating (2000 revolutions per minute for 80 seconds), obtaining a passivation layer that is cured in the oven at 80° C. for one hour. The thickness of the PDMS layer is, in one application, 20 μm.

Figure 12:
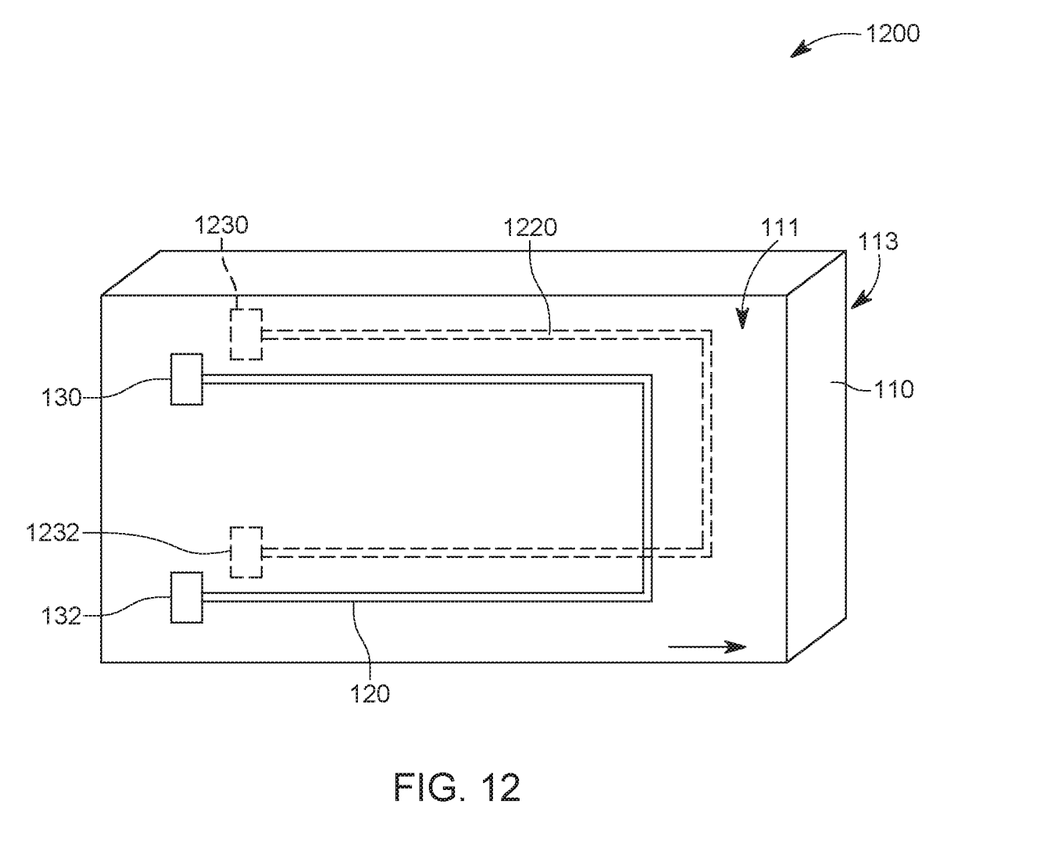
FIG. 12 shows another embodiment in which the bending sensor has two different electrodes formed on opposite faces of the substrate.

The previous embodiments disclose the manufacturing of the LIG electrode on a single face of the substrate. However, as illustrated in FIG. 12, it is possible to make the same or a different electrode on a second face of the substrate. For example, as illustrated in FIG. 12, a first LIG electrode 120 is formed on a first face 111 of the substrate 110 and a second LIG electrode 1220 is formed on a second face 113 of the substrate 110. In one application, the first face 111 is opposite to the second face 113. The two LIG electrodes 120 and 1220 may be identical, as shown in FIG. 12. However, in one application, the second LIG electrode may have a different shape than the first LIG electrode 110, e.g., the first LIG electrode 120 is as shown in FIG. 1B and the second LIG electrode 1220 is as shown in any of FIGS. 2 to 5.

With the configuration shown in FIG. 12, it is possible to electrically connect the two LIG electrodes in series, parallel, or independent from each other. Thus, various processing may be applied to the recording signals to improve the measured bending of the substrate. As previously discussed, by measuring the bending of the substrate, it is possible to estimate various parameters of the medium, e.g., flow, force, acceleration, displacement. The sensor 1200 shown in FIG. 12 may be manufactured as described in the method of FIG. 10 and may be integrated in the hand-held device 700.

The various sensors discussed above have in common a polyimide film 110 that serves as a flexible insulating substrate while the porous carbon structure induced by laser irradiation is the sensing electrode 120. The sensor 100 or 1200 is based on the piezoresistive properties of porous graphene and may be coated with a thin layer of PDMS to provide a wider spectrum of applications, both in fluid and gaseous media. Furthermore, the fast response and the simple fabrication process make this sensor suitable for a wide range of applications.

Figure 13:
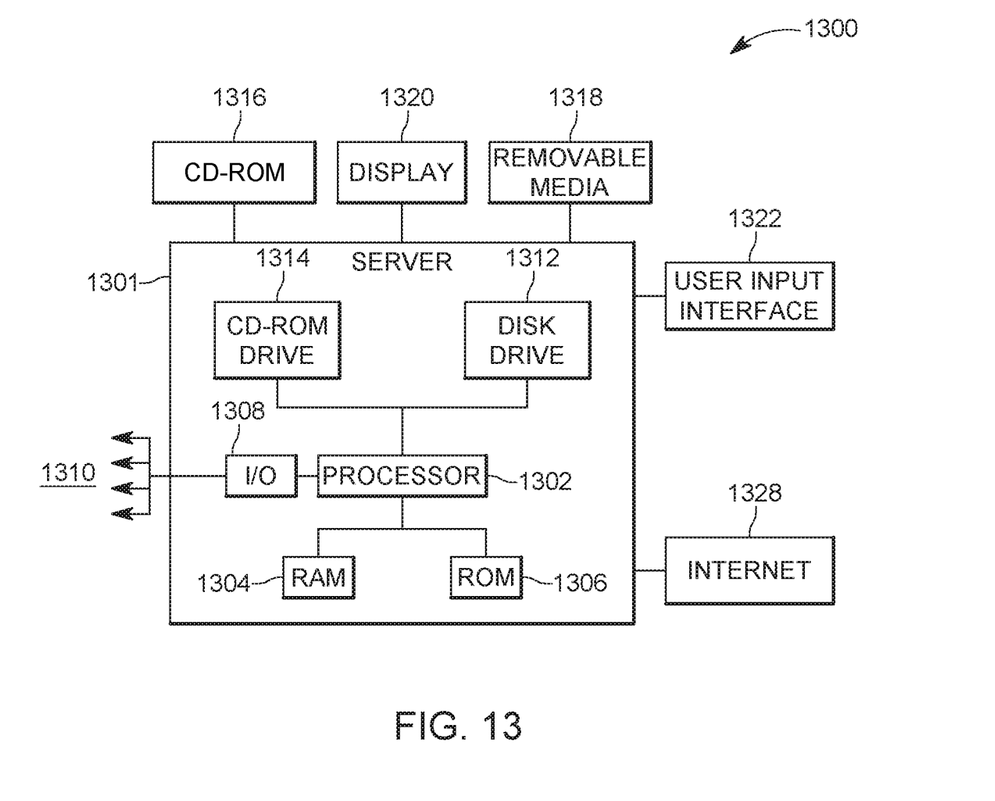
FIG. 13 is a schematic of a computing device in which the methods and processes discussed herein can be implemented.

The above-discussed measuring device 160 may be implemented in a computing device as illustrated in FIG. 13. Hardware, firmware, software or a combination thereof may be used to perform the various steps and operations described herein.

Computing device 1300 suitable for performing the activities described in the embodiments may include a server 1301. Such a server 1301 may include a central processor (CPU) 1302 coupled to a random access memory (RAM) 1304 and to a read-only memory (ROM) 1306. ROM 1306 may also be other types of storage media to store programs, such as programmable ROM (PROM), erasable PROM (EPROM), etc. Processor 1302 may communicate with other internal and external components through input/output (I/O) circuitry 1308 and bussing 1310 to provide control signals and the like. Processor 1302 carries out a variety of functions as are known in the art, as dictated by software and/or firmware instructions.

Server 1301 may also include one or more data storage devices, including disk drives 1312, CD-ROM drives 1314 and other hardware capable of reading and/or storing information, such as DVD, etc. In one embodiment, software for carrying out the above-discussed steps may be stored and distributed on a CD-ROM or DVD 1316, a removable media 1318 or other form of media capable of portably storing information. These storage media may be inserted into, and read by, devices such as CD-ROM drive 1314, disk drive 1312, etc. Server 1301 may be coupled to a display 1320, which may be any type of known display or presentation screen, such as LCD, plasma display, cathode ray tube (CRT), etc. A user input interface 1322 is provided, including one or more user interface mechanisms such as a mouse, keyboard, microphone, touchpad, touch screen, voice-recognition system, etc.

Server 1301 may be coupled to other devices. The server may be part of a larger network configuration as in a global area network (GAN) such as the Internet 1328, which allows ultimate connection to various landline and/or mobile computing devices.

The disclosed embodiments provide a bending sensor for measuring a flow, force, acceleration or displacement. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a general-purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Novoselov, K. S., Geim, A. K., Morozov, S. V, Jiang, D., Zhang, Y., Dubonos, S. V, Firsov, A. A. et al. (2004). Electric Field Effect in Atomically Thin Carbon Films. Science, 306(5696), 666 LP-669. on Electricity and Magnetism, 3rd ed., vol. 2. Oxford: Clarendon, 1892, pp.68-73.
[2] Novoselov, K. S., Fal, V. I., Colombo, L., Gellert, P. R., Schwab, M. G., Kim, K., Kim, K. et al. (2013). A roadmap for graphene. Nature, 490(7419), 192-200.
[3] Pang, C., Lee, C., and Suh, K. Y. "Recent advances in flexible sensors for wearable and implantable devices." (2013) Journal of Applied Polymer Science, 130(3), 1429-1441.
[4] A. Alfadhel, J. Kosel, "Magnetic Nanocomposite Cilia Tactile Sensor," Advanced Materials, 27, 47, pp. 7888-7892 (2015).

What is claimed is:

1. A bending sensor comprising:
a flexible substrate made of polyimide;
a laser-induced graphene electrode formed into a top surface of the flexible substrate; and
first and second pads formed as a laser-induced graphene into the top surface of the flexible substrate, wherein the first and second pads are in electrical contact with the laser-induced graphene electrode,
wherein a bending of the flexible substrate and the laser-induced graphene electrode changes a resistivity of the laser-induced graphene electrode, which is indicative of an amount of bending, and
wherein the laser-induced graphene electrode has plural portions placed at various angles relative to a longitudinal axis.

2. The bending sensor of claim 1, wherein the amount of bending is associated with a fluid flow that bends the substrate.

3. The bending sensor of claim 1, wherein the amount of bending is associated with a force that bends the substrate.

4. The bending sensor of claim 1, wherein the amount of bending is associated with an acceleration of a portion of the substrate.

5. The bending sensor of claim 1, wherein the amount of bending is associated with a displacement of a portion of the substrate.

6. The bending sensor of claim 1, wherein the laser-induced graphene electrode is calibrated to determine a first bending about a first axis and a second bending about a second axis, which is perpendicular on the first axis.

7. The bending sensor of claim 1, further comprising:
another laser-induced graphene electrode placed on a same face of the flexible substrate.

8. The bending sensor of claim 7, wherein a shape of the another laser-induced graphene electrode is different from a shape of the laser-induced graphene electrode.

9. The bending sensor of claim 7, wherein a position of the another laser-induced graphene electrode along a longitudinal axis is different from a position of the laser-induced graphene electrode.

10. The bending sensor of claim 7, wherein the laser-induced graphene electrode determines a bending about a first axis and the another laser-induced graphene electrode determines a bending about a second axis, perpendicular on the first axis.

11. The bending sensor of claim 1, further comprising:
another laser-induced graphene electrode placed on an opposite face of the flexible substrate.

12. The bending sensor of claim 11, wherein the another laser-induced graphene electrode is electrically connected in series or in parallel to the laser-induced graphene electrode.

13. A hand-held bending measuring instrument comprising:
a body;
a bending sensor attached to the body; and
a measuring device that translates measurements of the bending sensor into a given parameter,
wherein the bending sensor includes,
a flexible substrate made of polyimide; and
a laser-induced graphene electrode formed into a top surface of the flexible substrate,
wherein a bending of the flexible substrate and the laser-induced graphene electrode changes a resistivity of the laser-induced graphene electrode, which is indicative of an amount of bending, and
wherein the laser-induced graphene electrode has plural portions placed at various angles relative to a longitudinal axis.

14. The instrument of claim 13, wherein the amount of bending is associated with a flow that bends the substrate, or with a force that bends the substrate, or with an acceleration of a portion of the substrate, or with a displacement of a portion of the substrate.

15. The instrument of claim 13, wherein the sensor further comprises:
another laser-induced graphene electrode placed on a same face of the flexible substrate.

16. The instrument of claim 13, wherein the sensor further comprises:
another laser-induced graphene electrode placed on an opposite face of the flexible substrate.

17. A method for forming a bending sensor, the method comprising:
providing a flexible substrate made of polyimide;
providing a laser device at a given distance from the flexible substrate; and
carbonizing with the laser a portion of the flexible substrate to form a laser-induced graphene electrode on a top surface of the flexible substrate,
wherein the laser-induced graphene electrode has plural portions placed at various angles relative to a longitudinal axis.

18. The method of claim 17, further comprising:
forming first and second pads on the top surface of the flexible substrate with the laser, wherein the first and second pads are in electrical contact with the laser-induced graphene electrode.

19. The method of claim 18, further comprising:
covering the laser-induced graphene electrode with a polydimethylsiloxane layer.

\* \* \* \* \*